United States Patent [19]
Bizuneh et al.

[11] Patent Number: 5,546,021
[45] Date of Patent: Aug. 13, 1996

[54] 3-STATE BiCMOS OUTPUT BUFFER HAVING POWER DOWN CAPABILITY

[75] Inventors: Daniel T. Bizuneh, Tempe; Carlos Obregón, Phoenix; Michael A. Wells, Chandler; Eric D. Neely, Mesa, all of Ariz.

[73] Assignee: Motorola, Inc., Schaumburg, Ill.

[21] Appl. No.: 194,974

[22] Filed: Feb. 14, 1994

[51] Int. Cl.⁶ .................................................. H03K 19/0175
[52] U.S. Cl. ............................ 326/86; 326/84; 326/58
[58] Field of Search .................................. 307/473, 446, 307/475, 443, 296.2, 296.5; 326/58, 84, 86, 27, 110

[56] References Cited

U.S. PATENT DOCUMENTS

| | | | |
|---|---|---|---|
| 5,153,457 | 10/1992 | Martin et al. | 307/473 |
| 5,223,745 | 6/1993 | Ohannes et al. | 307/443 |
| 5,231,311 | 7/1993 | Ferry et al. | 326/27 |
| 5,256,914 | 10/1993 | Boomer | 307/473 |
| 5,266,849 | 11/1993 | Kitahara et al. | 307/443 |
| 5,276,364 | 1/1994 | Wellheuser | 307/443 |
| 5,338,978 | 8/1994 | Larsen et al. | 307/443 |

FOREIGN PATENT DOCUMENTS 0414354  2/1991  European Pat. Off. .
0481329  4/1992  European Pat. Off. .

OTHER PUBLICATIONS

Fletcher et al. Sep. 1990. "Bicmos Futurebus Transceiver" IEEE International Conference On Computer Design. pp. 11–13.
E. Schoppnies. 1991. "Bicmos Fur Die Zukunft" Radio Fernsehen Elektronik. vol. 40. No. 3/4, p. 154.

*Primary Examiner*—Edward P. Westin
*Assistant Examiner*—Benjamin D. Driscoll
*Attorney, Agent, or Firm*—Bradley J. Botsch, Sr.; Rennie William Dover

[57] ABSTRACT

A 3 state BiCMOS output buffer (100) with power down capability has been provided. The buffer includes an input stage (102), responsive to an input signal, an output coupled to both a pull-up driver (114), and an output pull-down driver (116) wherein the drivers provide an output signal at an output of the buffer in response to the input signal. Additionally, the buffer includes a power down sense circuit (108), coupled to a power supply node (118), for turning off an output pull-up transistor (214) when the power supply node is powered down and thus eliminating leakage paths within the buffer. The buffer also includes a noise limiting circuit (112) for slowing down a high to low transition at the output of the buffer thereby reducing the switching noise of the buffer while not affecting the overall speed of the buffer.

13 Claims, 4 Drawing Sheets

3-STATE BICMOS OUTPUT BUFFER HAVING POWER DOWN CAPABILITY

BACKGROUND OF THE INVENTION

The present invention relates in general to BiCMOS output buffers and, more particularly, to a 3-state BiCMOS output buffer that can be placed in a power-down mode and remain impervious to voltage supply and external interface bus conditions.

It is known in the art that output buffers, hereinafter referred to as buffers, are used in large scale integrated circuits and in electronic systems to drive bus lines. These buffers may be located on the same integrated circuit die or on different die, depending upon the system configuration. A multiple of buffers may also be connected to a common bus line that in turn is connected to the addressing inputs of such devices as microprocessors, memories and registers. These buffers typically incorporate 3-state features to remove output buffer signals that are not required on the output bus for given signal conditions.

In order to reduce power consumption, it is desirable to inactivate circuitry that is not in use, such as the output buffer. It is also advantageous to incorporate circuits powered by one power supply voltage but able to interface to devices powered by different power supply voltages within the bussed system.

However, when utilizing reduced power technology, undesirable conditions can develop between the bus line and the power supply line of the inactive powered down buffer. For example, in a typical BICMOS output buffer, a PMOS transistor is used as an upper driving transistor. It is desired that a bus line, that is driven by an active buffer, maintain the voltage level and current drive capability that is presented by the active buffer even when a co-existing bus buffer is powered down and rendered inactive. Typically, a bus line, at some point in time, will receive an output from an active buffer whose output is in a high state while the commonly bussed buffer will be in a powered down state. When this occurs, the upper PMOS driving transistor of the powered-down buffer will experience abnormal biasing conditions. The drain of the transistor, p-type semiconductor material, will continue to be biased at the voltage level of the bus line. However, this voltage can be near the higher power supply voltage rail. Since the power supply voltage of the powered down buffer has collapsed; the source of the PMOS transistor will reside at zero volts. The backgate of the PMOS transistor, which is n-type material and typically biased to the same potential as the source of the transistor, also resides at zero volts. Thus, a parasitic pn diode is formed from the drain of the transistor to the collapsed supply voltage, producing an undesirable path for current to be displaced from the bus line.

To combat this condition, a diode is sometimes placed between the power supply and the backgate of the PMOS transistor to establish a blocking structure to the current. However, the diode solves only a portion of the problem. If the inactive circuit was placed in a 3-state mode prior to powering down, a second current robbing mechanism is activated. In this case, the drain, source, and backgate of the PMOS structure remain as described above, but the gate is now biased at or near zero volts. In this situation, the PMOS transistor is now made active in an inverse mode and again conducts current away from the bus line thereby negating the positive effect of the diode.

Hence, a need exists for an efficient power down circuit that is capable of inactivating a given buffer circuit on a bus line while maintaining the integrity of the required voltage level and the required current driving conditions of the bus line.

DETAILED DESCRIPTION OF THE DRAWINGS

Generally, the present invention provides a circuit and a method for providing a BICMOS buffer circuit that has power down capability and for coupling to a bus which may have a plurality of voltages appearing thereon. This is accomplished by designing the buffer circuit such that during power down, when the bus is at some voltage level and power supplied to the output buffer is at a lower level, a leakage path developed due to the presence of an output PMOS transistor is eliminated by using a power down sense circuit that delivers a turn off signal to the gate of the output PMOS transistor. The power down sense circuit uses a PMOS transistor as a feedback transistor from the bus to maintain the same voltage level at the gate and the drain of the output PMOS transistor, which turns off the output PMOS transistor during power down. Additional leakage paths to the bus created by PMOS transistors in the buffer are eliminated by the inclusion of additional circuitry inside the power down sense circuit to maintain the same voltage level at the gate and drain of the respective PMOS transistors. Switching noise is also minimized by the use of a noise limiting current driver circuit at the output of the buffer.

Figure 1:
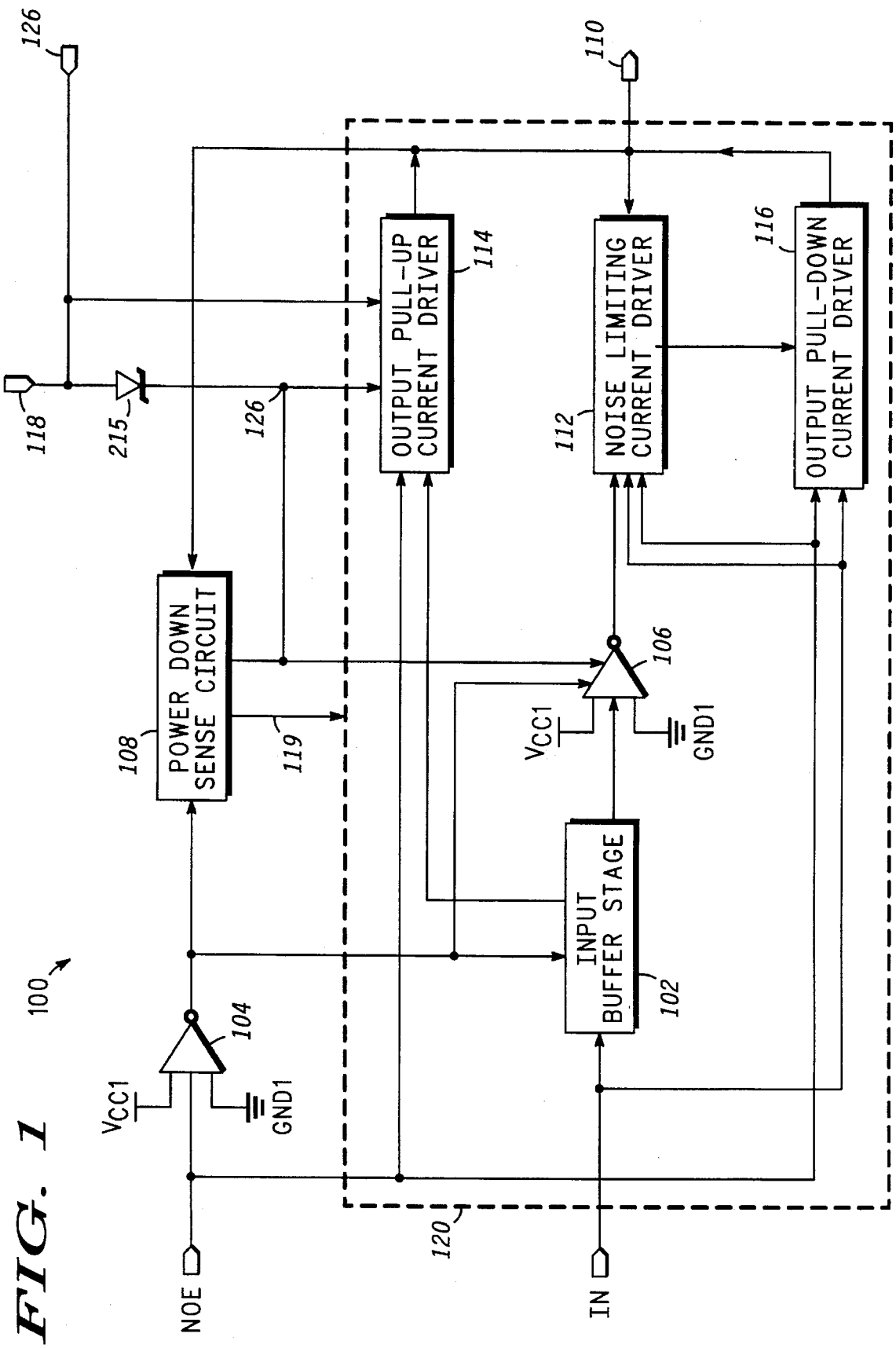
FIG. 1 is a block diagram of a single voltage supply BiCMOS 3-state output buffer circuit with power down capability in accordance with the present invention.

FIG. 1 illustrates a detailed block diagram of buffer circuit 100. Referring to FIG. 1, a single voltage supply BiCMOS 3-state output buffer circuit 100 is shown suitable for manufacturing as an integrated circuit using conventional integrated circuit processes. Output buffer circuit 100 may also be implemented as a combination of integrated circuits or as a combination of integrated circuits and discrete devices.

Output buffer circuit 100 comprises buffer circuitry block 120, power down sense circuit 108, and inverter 104.

In the buffer circuitry block 120, an input buffer stage 102 receives a logic input signal from input IN. IN is also coupled to an input of the output pull-down current driver 116 to provide the proper signal for a logic 1 i.e., a logic high or a logic 0 i.e., a logic low state at output 110. IN is further directed to an input of noise limiting current driver 112.

Input buffer stage 102 provides a driving signal to output pull-up current driver 114 serves and as a gain element to drive inverter 106, wherein drive inverter 106 serves as a second gain element. The resulting output signal from inverter 106 drives noise limiting current driver 112, the latter receiving a feedback signal from the buffer circuit output 110.

Noise limiting current driver 112 in turn provides a current boost signal to the output pull-down current driver 116 to provide a rapid turn-on of the signal appearing at output 110 when it is driven to a logic 0 state.

The output of the output pull-up current driver 114 is coupled to the output of the output pull-down current driver 116 both of which are coupled to output 110.

Power down sense circuit 108 receives a signal from output 110. Power supply conductor 118 is coupled through a Schottky diode 215 to node 126, with the node commonly connected to the power down sense circuit 108 and to the output pull-up driver 114. Power supply conductor 118 is also connected to the output pull-up current driver 114. It is worth noting that although component 215 has been shown to be a Schottky diode, it is understood that any diode may be utilized for component 215.

Figure 2:
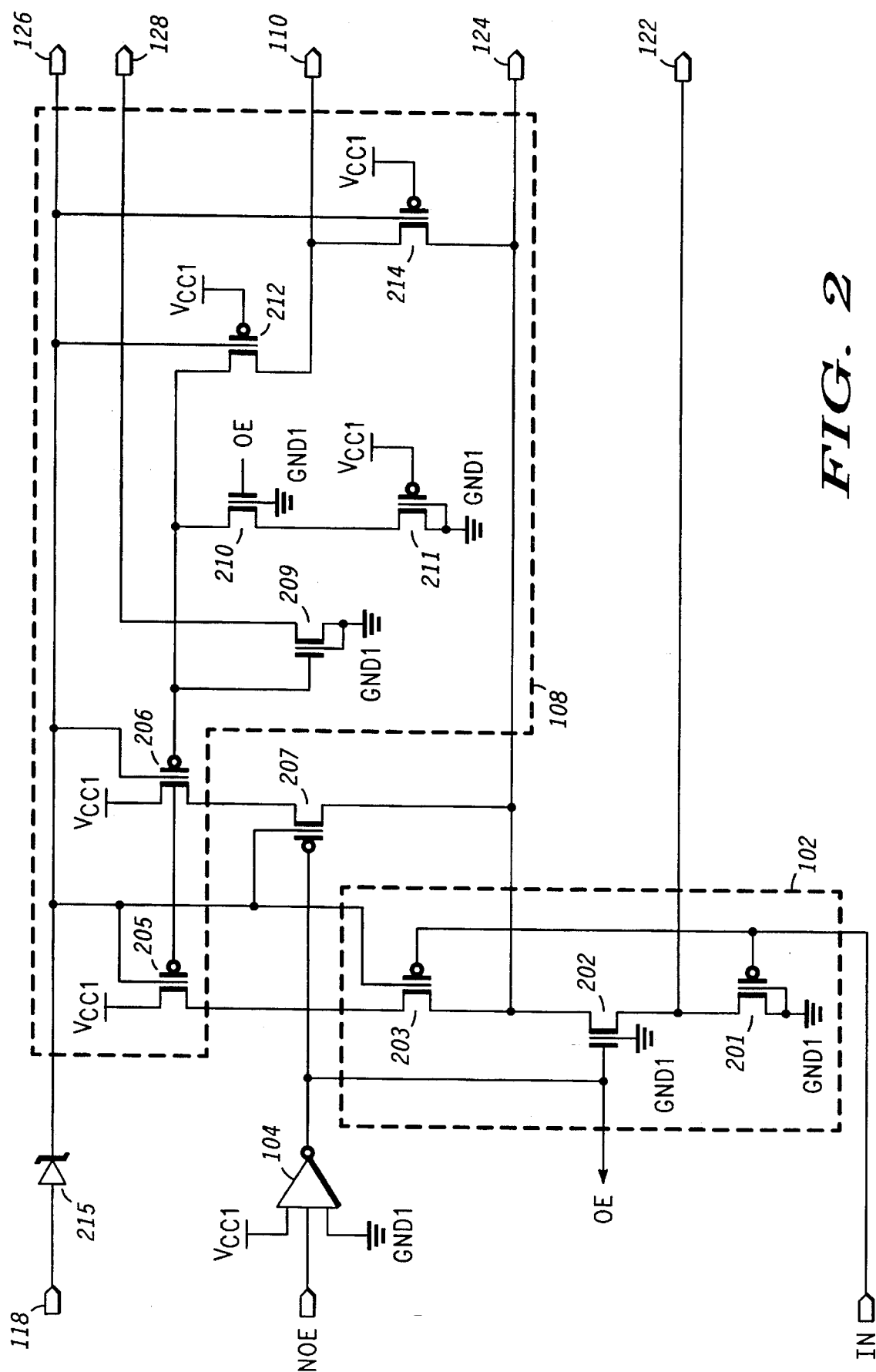
FIG. 2 is a schematic diagram providing further detail of one embodiment of the 3-state input stage circuit and the power down sequence circuit, shown in FIG. 1.
Figure 3:
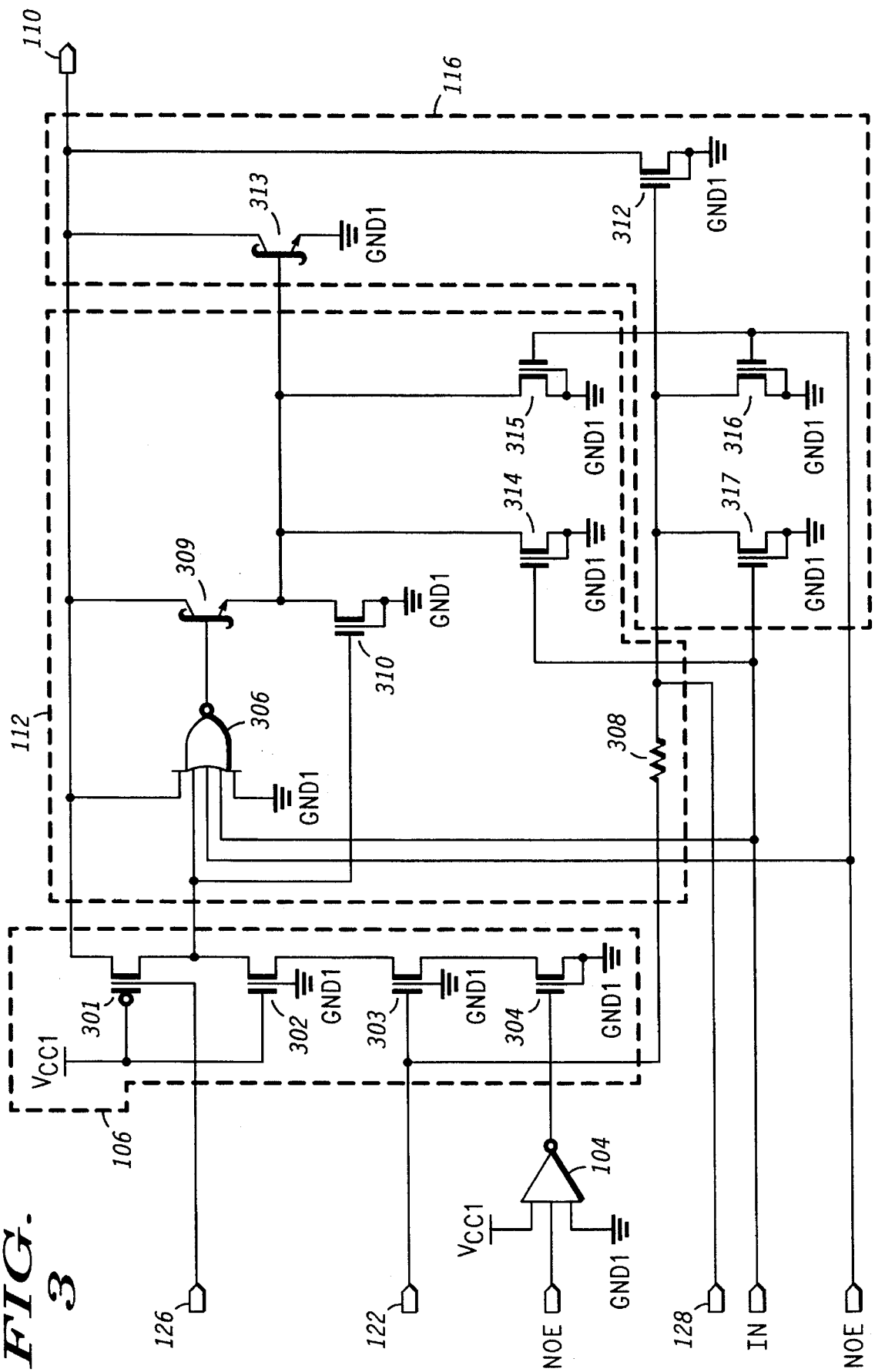
FIG. 3 is a schematic diagram providing further detail of one embodiment of the inverter circuit, the noise limiting current driver circuit, and the output pull down driver circuit, shown in FIG. 1.
Figure 4:
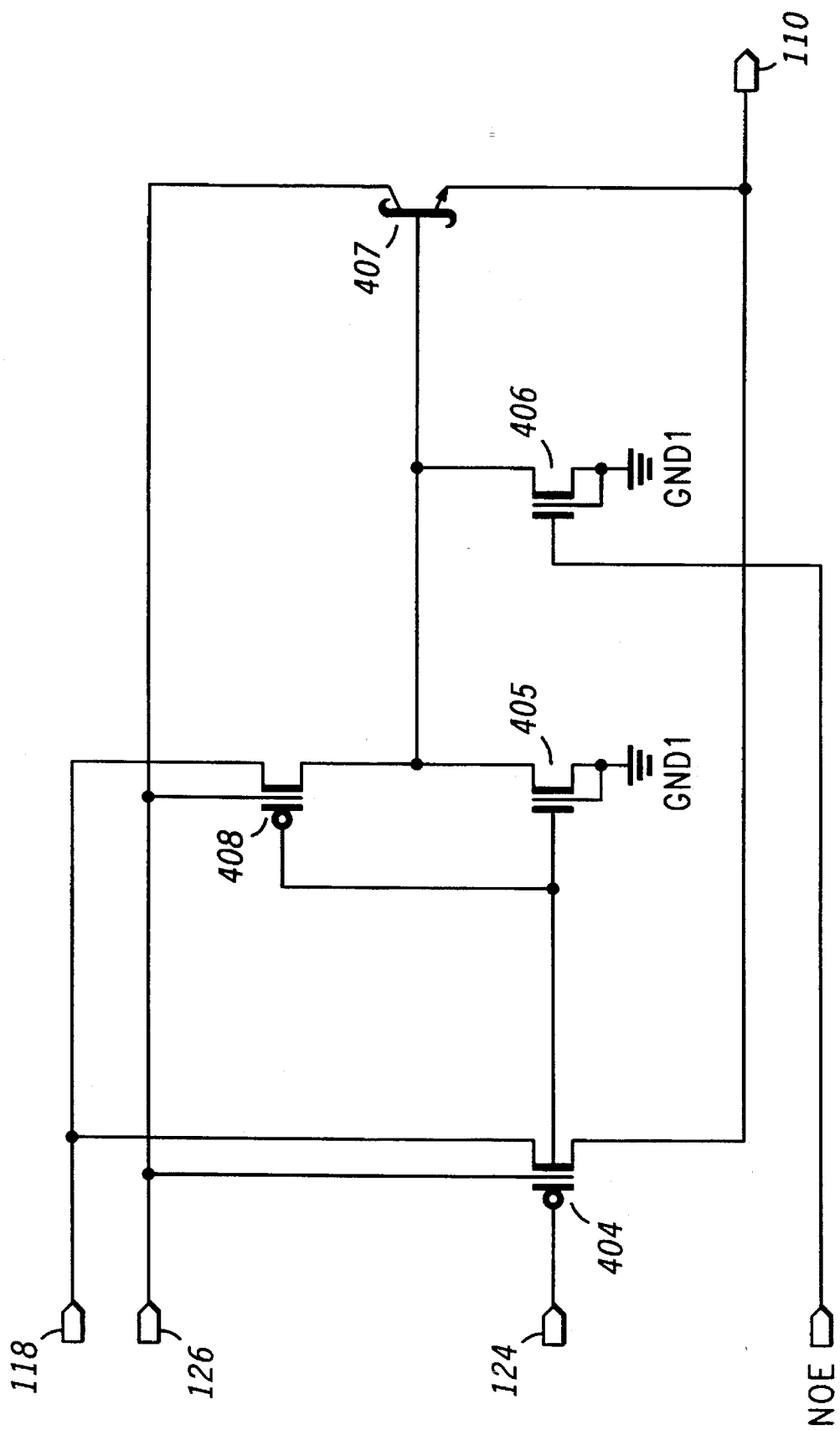
FIG. 4 is a schematic diagram providing further detail of one embodiment of the output pull up driver circuit, shown in FIG. 1.

The power down sense circuit 108 senses the voltage present at node 126, which is a derivative of the voltage at node 118. The output of the power down sense circuit 108 is coupled to buffer circuitry block 120 as shown by line 119. The components of the buffer circuitry block 120 include circuits, as shown in FIG. 2, FIG. 3, and FIG. 4, that are responsive to the power down signal from the power down sense circuit 108.

A 3-state "not output enable" logic signal NOE is provided to the inputs of inverter 104, noise limiting current driver 112, output pull-up current driver 114, and output pull-down driver 116. The output of inverter 104 further transfers the inverted 3-state NOE signal to input buffer stage 102, to inverter 106, and to the power down sense circuit 108.

When input signal NOE is a logic 1, output 110 switches to a 3-state impedance mode, with the output 110 transparent to any input signal appearing at IN. When input signal NOE is a logic 0, the output 110 will respond normally to an applied logic signal input IN at buffer circuitry block 120.

Inverters 104 and 106 are concurrently coupled between a first power supply conductor VCC1 and a second power supply conductor GND1. The power supply conductor VCC1 is continuously active, i.e., either at 3 volts or 5 volts dependent upon the application, during normal operation or independent power down of buffer circuitry block 120.

Inverter circuit 104 is a simple BICMOS inverter where its input, NOE, determines whether the output buffer circuit 100 resides in a disable or enable state. The output of inverter circuit 104 is coupled to input buffer stage circuit 102 and inverter circuit 106. Input buffer stage circuit 102 is the 3-state input stage. A function of input buffer stage circuit 102 is to invert the input signal IN whenever the output buffer circuit 100 is in the enable state. If output buffer circuit 100 is in a disabled state, the output of input buffer stage circuit 102 will enter a high impedance state. Inverter 106 is an inverting stage having its output go low when the gate of 3 stacked NMOS transistors (shown in FIG. 3 and discussed in detail hereinafter) goes high. Inverter circuit 106 will eliminate the leakage current path to the pull down transistors during power down.

Output pull-up current driver circuit 114 includes the output pull up transistors. The output buffer has a BiCMOS pull-up structure. This pull-up circuit structure includes an output PMOS transistor in parallel with an output Bipolar transistor (shown in FIG. 4 and discussed in detail hereinafter). During power down and because of the presence of the output PMOS transistor, an undesirable leakage path exists from the bus to power supply conductor 118. To eliminate this leakage path, the present invention provides power down sense circuit 108. Power down sense circuit 108 stops the leakage path by using a feedback PMOS transistor (shown in FIG. 2 and discussed in detail hereinafter). During power down, the feedback PMOS transistor maintains the same voltage level at the gate and drain of the output PMOS transistor. The same voltage at the gate and drain of a PMOS transistor implies that the transistor is turned off. Further explanation of this operation is provided in the detailed description for FIGS. 2–4.

Output pull-down current driver circuit 116 is an output pull down driver. The BiCMOS output driver has an NMOS and bipolar transistor in parallel (shown in FIG. 3 and discussed in detail hereinafter). However, at cold temperatures, the presence of the NMOS transistor in the output pull down driver circuit 116 creates undesirable switching noise. To minimize the effect of this switching noise, the present invention provides noise limiting current driver circuit 112. Noise limiting current driver circuit 112, in conjunction with, output pull down driver circuit 116, slows down the high to low transition speed at the output 110 without affecting the overall speed of the output buffer which implies the effect of the output NMOS pull down transistor has minimal effect on the noise of the output buffer circuit 100.

FIG. 2 shows a portion of buffer circuit 100 for illustrating a detailed schematic diagram of power down sense circuit 108. Referring to FIG. 2, input logic signal IN is coupled to input buffer stage 102 via the gate of n-channel transistor 201 and the gate of p-channel transistor 203. The source of transistor 201 is connected to the second power supply conductor GND1. The drain of transistor 201 is connected both to node 122 and to the source of n-channel transistor 202. The drain of transistor 202 is coupled to node 124, to the drain of transistor 203, and to the drain of p-channel transistor 207. The source of transistor 203 is coupled to the drain of p-channel transistor 205.

Signal OE, appearing at the output of inverter 104, is derived from the "not output enable" (NOE) via inverter 104. Inverter 104 is coupled between the first power supply conductor VCC1 and the second power supply conductor GND1. The output signal OE of inverter 104 is coupled to the gates of transistors 202, 207 and 210.

A logic 0 appearing on signal NOE results in a logic 1 appearing on signal OE thereby enabling input buffer stage 102 to receive the input signal and to provide a signal to the output node 110. A logic 1 appearing on signal NOE results in a logic 0 appearing on signal OE thereby placing the buffer 102 in a tri-state, impedance mode.

The source of transistor 207 is coupled to the drain of p-channel transistor 206. Node 110 is coupled to the source of transistor 214 and to the source of p-channel transistor 212. The drain of transistor 212 is coupled to the gate of n-channel transistor 209 and to the gates of p-channel transistors 205 and p-channel transistor 206. The source of transistor 210 is coupled to the drain of n-channel transistor 211 whose source is coupled to the second power supply conductor GND1. P-channel feed back transistor 214 is connected with its source coupled to node 110 and its drain coupled to node 124.

The sources of transistors 205 and 206 are coupled to the first power supply conductor VCC1. The gates of transistors 211, 212, and 214 are coupled to the first power supply conductor VCC1 so as to prepare for activation of the transistors by the power down sense circuit 108 when buffer circuitry block 120 is powered down independently from the remainder of the system. The backgates of the p-channel transistors 203, 205, 206, 207, 212, and 214 are coupled to node 126. The backgates of n-channel transistors 201, 202, 209, 210, and 211 are coupled to the second power supply conductor GND1.

Transistor 209 has a drain coupled to node 128 for providing an input signal to the noise limiting current driver circuit 112 of FIG. 3. The source of transistor 209 is coupled to the second power supply conductor GND1. A 3-volt or 5-volt power supply is connected to node 118. This supply voltage appearing at node 118 is capable of being powered down independently of the other power supply conductors, VCC1 and GND1, that are applied to output buffer circuit 100. Node 118 is then coupled through Schottky diode 215, with its anode coupled to node 118 and its cathode coupled to node 126.

FIG. 2 shows the input buffer stage circuit 102 and the power down sense circuit 108. Input stage buffer circuit 102 functions as an inverter when the output buffer circuit 100 is in the enable state and goes to an impedance state when the output buffer circuit 100 is in a disable state. The power down sense circuit 108 includes a feedback PMOS transistor 214. During power down, when the bus voltage at output node 110 is above the threshold voltage of transistor 214, the feedback PMOS transistor 214 turns on and maintains the voltage at node 124 at the same level as the voltage at the output node 110. Node 124 drives the gate of the output pull up PMOS transistor 404 as shown on FIG. 4. Since the gate of the output pull up PMOS transistor 404 has the same voltage as the output node 110, the output pull up PMOS transistor 404 will turn off thereby blocking the leakage path through the output pull up PMOS transistor 404.

However, the addition of the feedback PMOS transistor 214 creates another leakage path because transistor 214 is in an on state all the time during power down. The new leakage path is through transistor 214 and propagates backward to the input stage through transistor 203 and transistor 207 to power supply node 118. To eliminate this leakage current path, the present invention provides transistors 205, 206, 210, 211 and 212. During power down, transistors 210 and 211 are turned off and transistor 212 is turned on which implies the voltage at the gates of PMOS transistors 205 and 206 will be the same as the voltage at the output node 110, turning off transistors 205 and 206 and thereby eliminating the leakage path through transistors 203 and 207. Transistor 209 ensures that the output pull down NMOS transistor 312 gets turned off through node 128 during power down. Node 128 is tied to the gate of the output pull down NMOS transistor 312 as shown on FIG. 3. Thus, transistor 209 maintains a voltage appearing at an input of the pull-down circuit 116 (the control electrode of transistor 312) substantially equal to the voltage appearing at output 110 thereby disabling pull-down circuit 116.

FIG. 3 shows a portion of buffer circuit 100 for illustrating a detailed schematic diagram of noise limiting current driver circuit 112 and output pull-down circuit 116. Referring to FIG. 3, a 3-state "not output enable" logic signal NOE is provided to the input of inverter 104. The output of inverter 104 further transfers the inverted 3-state NOE signal to inverter 106 via the gate of n-channel transistor 304 whose source is coupled to the second power supply conductor GND1. The drain of transistor 304 is coupled to the source of n-channel transistor 303 whose gate receives an inverted representation of signal IN via node 122. The drain of transistor 303 is coupled to the source of n-channel transistor 302. The drain of transistor 302 is coupled to the drain of p-channel transistor 301, an input to nor gate 306, and the gate of n-channel transistor 310 whose source is coupled to the second power supply conductor GND1.

The gates of transistors 301 and 302 are coupled to a first power supply conductor VCC1. The backgate of transistor 301 is coupled to node 126. The output of nor gate 306 is coupled to the base of NPN Schottky clamped transistor 309. The emitter of transistor 309 is coupled to the drain of transistor 310, to the drains of n-channel transistors 314 and 315, and to the base of NPN Schottky clamped transistor 313.

The emitter of transistor 313 is coupled to the second power supply conductor GND1. Additionally, the sources of transistors 314 and 315 are coupled to the second power supply conductor GND1. Inverter 104 is coupled between a first power supply conductor VCC1 and a second power supply conductor GND1.

The inverse of signal IN, appearing at node 122, is supplied through resistor 308 and to node 128, to the drains of n-channel pull-down driver transistors 317 and 318, and to the gate of n-channel output transistor 312. The sources of transistors 317 and 318 are coupled to the second power supply conductor while the gates of transistors 317 and 318 are respectively coupled to receive signals IN and NOE.

The source of transistor 301, the power supply conductor for nor gate 306, the drain of transistor 312, and the collectors of transistors 309 and 313 are commonly connected to output node 110. The back gate of transistors 302, 303, 304, 310, 312, 314, 315, 317, and 318 are commonly connected to the second power supply conductor GND1.

The output pull-down current driver circuit 116 includes transistors 312, 313, 317 and 318. When the input of the output buffer circuit 100 is low, transistors 312 and 313 get turned on, at which point the output buffer circuit 100 sinks current through transistors 312 and 313 and the output of buffer circuit 100 gets pulled down at node 110. However, at low temperatures the presence of NMOS transistor 312 in the output pull down current driver circuit 116 creates undesirable switching noise. The present invention provides noise limiting current driver circuit 112 to minimize the switching noise effect at all temperatures. Noise limiting current driver circuit 112 uses a feedback nor gate to drive the output pull down bipolar transistor 309. Since the input of the output buffer circuit 100 drives directly to one input of the nor gate 306, the high to low transition at 110 is fast. But, a faster high to low transition at the output 110 equates to a higher noise level of the buffer circuit 100. To slow down the high to low transition without affecting the overall speed of the output buffer circuit 100, a resistor 308 is tied between the gate of the output pull down NMOS transistor 312 and node 122, which is the output of input stage circuit 102. During a high to low transition at node 110, a substantial amount of the work is done by the bipolar transistor 313, while transistor 312 contributes to pulling down the voltage at node 110. An advantage of transistor 312 is that during DC operation, transistor 312 is capable of sinking current per a given DC specification. Also during AC switching, transistor 312 makes sure that the output 110 gets completely pulled down.

Inverter circuit 106 consists of transistors 301, 302, 303 and 304. The presence of these transistors eliminates any possible base current to transistor 309 during power down and power up. When the inputs of transistors 302, 303 and 304 go high, the output of inverter circuit 106 goes low.

FIG. 4 shows a portion of buffer circuit 100 for illustrating a detailed schematic diagram of output pull-up circuit 114. Referring to FIG. 4, the logic signal at node 124, which was generated as an output of the input buffer stage 102 in FIG. 1, is coupled to the gates of p-channel transistor 404, n-channel transistor 405, and the gate of p-channel transistor 408. The drain of transistor 404 is coupled to the output node 110 and to the emitter of NPN Schottky transistor 407. The drains of transistors 405, 408, and the drain of n-channel transistor 406 are coupled to the base of transistor 407. The sources of transistors 405 and 406 are commonly coupled to the second power supply conductor GND1. The gate of transistor 406 receives the "not output enable" signal NOE. The sources of transistors 404 and 408 are coupled to the power supply conductor 118 while their backgates are coupled to node 126. Also coupled to node 126 is the collector of transistor 407. The backgates of transistors 405 and 406 are commonly connected to the second power supply conductor GND1.

When signal IN is at a logic 1, node 124 goes low thereby turning on transistors 404, 408 and 407 and forcing the output of the pull-up current driver circuit node 110 to a logic 1 state. However, when signal IN is at a logic low, node 124 is driven high thereby turning off transistors 404, 408 and 407 and pulling down the output of the buffer circuit at node 110 to a logic low. During power down, node 124 resides at approximately the same voltage level as the output of the buffer node 110 when transistor 214 of FIG. 2 is turned on. Since the gate and drain of transistor 404 are at the same voltage level during power down, there will be no leakage current through transistor 404.

By now it should be apparent that a tri-state BiCMOS output buffer with power down capability has been provided. The buffer includes an input stage, responsive to an input signal, and has an output coupled to both a pull-up driver and an output pull-down driver. The drivers provide an output signal at an output of the buffer in response to the input signal. Additionally, the buffer includes a power down sense circuit, coupled to a power supply node, for turning off an output pull-up transistor when the power supply node is powered down, thereby eliminating leakage paths within the buffer. The buffer also includes a noise limiting circuit for slowing down a high to low transition at the output of the buffer thereby reducing the switching noise of the buffer while not affecting the overall speed of the buffer.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. An output buffer circuit having power down capability, comprising:

an input stage having an input and an output, said input of said input stage coupled for receiving an input signal;

a pull-up circuit having an input and an output, said input of said pull-up circuit coupled to said output of said input stage, said output of said pull-up circuit for sourcing current to an output of the output buffer circuit;

a pull-down circuit having an input and an output, said input of said pull-down circuit coupled to said input of said input stage, said output of said pull-down circuit directly connected to said output of said output buffer circuit for sinking current at said output of the output buffer circuit;

current driving means responsive to said output of said input stage for slowing down a transition rate of a signal appearing at said output of the output buffer circuit, said current driving means having an output coupled to said pull-down circuit; and a power down sense circuit being responsive to a first voltage in response to a power down condition for disabling the output buffer circuit, said power down sense circuit coupled to said input stage, said pull-up circuit and said pull-down circuit.

2. The output buffer circuit according to claim 1, wherein said power down sense circuit includes a transistor which is responsive to a second voltage, the second voltage appearing at said output of the output buffer circuit, and wherein the transistor maintains a third voltage, which appears at an input of said pull-up circuit substantially equal to said second voltage, which appears at said output of the output buffer circuit.

3. The output buffer circuit according to claim 1 wherein said power down sense circuit includes a first transistor, responsive to said first voltage, for disabling said pull-down circuit.

4. The output buffer circuit according to claim 2 wherein said power down sense circuit includes a transistor circuit for eliminating a leakage path due to said first transistor.

5. The output buffer circuit according to claim 1 further including tri-state means responsive to a control signal for providing a high impedance at said output of the output buffer circuit.

6. A method for powering down a buffer circuit, the buffer circuit including a pull-up circuit and a pull-down circuit, the method comprising the steps of:

receiving an input signal;

sourcing a first current at an output of the buffer circuit in response to said input signal being in a first logic state, said first current sourced from a first current source which is directly connected to said output of said output buffer circuit;

sinking a second current at said output of the buffer circuit in response to said input signal being in a second logic state, said second current sunk directly from said output of said output buffer circuit by a second current source;

slowing down a logic transition appearing at said output of the buffer circuit;

sensing a voltage appearing at a first terminal in response to a power down condition; and disabling the buffer circuit in response to said voltage sensed at said first terminal.

7. The method for powering down a buffer circuit according to claim 6 wherein said disabling the buffer circuit includes maintaining a voltage appearing at an input of the pull-down circuit substantially equal to a voltage appearing at said output of the buffer circuit.

8. The method for powering down a buffer circuit according to claim 6 wherein said disabling the buffer circuit includes maintaining a voltage appearing at an input of the pull-up circuit substantially equal to a voltage appearing at said output of the buffer circuit.

9. An output buffer circuit having power down capability, comprising:

an input stage having an input and an output, said input of said input stage coupled for receiving an input signal;

a current driver circuit having a plurality of inputs and an output, wherein at least one input of the plurality of inputs is coupled to the input of the input stage;

a pull-up circuit having an input an and output, said input of said pull-up circuit coupled to said output of said input stage, said output of-said pull-up circuit for sourcing current to an output of the output buffer circuit;

a pull-down circuit comprising a bipolar transistor having a first current conducting electrode, a second current conducting electrode, and a control electrode, said first current conducting electrode coupled to said output of said buffer circuit, said second current conducting electrode coupled to a first power supply conductor, and said control electrode coupled to said output of said current driver circuit, wherein the first current conducting electrode sinks current at said output of said output buffer circuit; and a power down sense circuit being responsive to a first voltage during a power down condition for disabling the output buffer circuit, said power down sense circuit coupled to said input stage, said pull-up circuit and said pull-down circuit.

10. The output buffer circuit of claim 9, wherein said pull-up circuit comprises a bipolar transistor having a first current conducting electrode, a second current conducting electrode, and a control electrode, said first current conducting electrode coupled to a second power supply conductor, said second current conducting electrode directly connected to said output of said output buffer, and said control electrode coupled to said output of said input stage, wherein said second current conducting electrode serves as said output for sourcing current to said output of said output buffer circuit.

11. An output buffer circuit having power down capability, comprising:

an input stage having an input and an output, said input of said input stage coupled for receiving an input signal;

a pull-up circuit having an input and an output, said output of said pull-up circuit for sourcing current to an output of the output buffer circuit;

a pull-down circuit having an input and an output, said input of said pull-down circuit coupled to said input of said input stage, said output of said pull-down circuit for sinking current at said output of the output buffer circuit;

a current driver circuit having a plurality of inputs and an output, wherein a first of said plurality of inputs is responsive to said output of said input stage and said output of said current driver circuit is coupled to said pull-down circuit; and a power down sense circuit being responsive to a first voltage during a power down condition for disabling the output buffer circuit, said power down sense circuit coupled to said input stage, said pull-up circuit and said pull-down circuit.

12. The output buffer circuit according to claim 11, wherein said current driver circuit includes a second input responsive to said input signal and a third input responsive to another input signal, said another input signal being an inverted form of said input signal.

13. The output buffer circuit according to claim 11, wherein said input of said pull-down circuit is directly connected to said input of said input stage.

* * * * *